United States Patent [19]

Yoshimura et al.

[11] Patent Number: 4,842,940
[45] Date of Patent: Jun. 27, 1989

[54] ELECTRODEPOSITION COATING COMPOSITION, ELECTRODEPOSITION PROCESS AND ELECTRODEPOSITED ARTICLE

[75] Inventors: Tatsushiro Yoshimura; Nobuyuki Tomihashi; Tsutomu Terada, all of Takatsuki, Japan

[73] Assignee: Daikin Kogyo Co, Ltd., Osaka, Japan

[21] Appl. No.: 935,418

[22] Filed: Nov. 26, 1986

[30] Foreign Application Priority Data

Nov. 28, 1985 [JP] Japan .................. 60-269160

[51] Int. Cl.$^4$ .................. C25D 13/06; C25D 13/12
[52] U.S. Cl. .................. 428/422; 204/181.6; 524/502; 524/507; 524/512; 524/901
[58] Field of Search ............ 524/507, 502, 512, 901; 204/181.6, 181.7, 181.4; 428/411.1, 418, 421, 422

[56] References Cited

U.S. PATENT DOCUMENTS

| | | | |
|---|---|---|---|
| 4,113,598 | 9/1978 | Jozwiak, Jr. et al. | 204/181.6 |
| 4,476,261 | 10/1984 | Patzschke et al. | 204/181.6 |
| 4,487,893 | 12/1984 | Yamabe et al. | 525/386 |

FOREIGN PATENT DOCUMENTS

| | | | |
|---|---|---|---|
| 1541286 | 10/1967 | France | 204/181.6 |
| 1180409 | 2/1970 | United Kingdom | 204/181.6 |

Primary Examiner—John F. Niebling
Assistant Examiner—Ben C. Hsing
Attorney, Agent, or Firm—Armstrong, Nikaido, Marmelstein, Kubovcik & Murray

[57] ABSTRACT

An electrodeposition coating composition comprising a fluorine-containing copolymer having an anionic functional group, a curing agent and water, said copolymer comprising:

(a) 20 to 80% by mole of the structural unit of the formula (1):

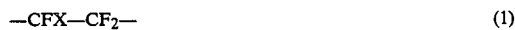

$$—CFX—CF_2— \quad (1)$$

(b) 5 to 60% by mole of the structural unit of the formula (2):

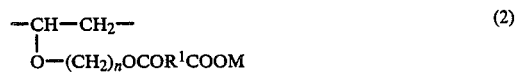

$$\begin{array}{c}—CH—CH_2—\\ |\\ O—(CH_2)_nOCOR^1COOM\end{array} \quad (2)$$

(c) 0 to 40% by mole of the structural unit of the formula (3):

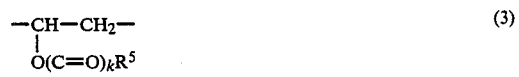

$$\begin{array}{c}—CH—CH_2—\\ |\\ O(C=O)_kR^5\end{array} \quad (3)$$

(d) 0 to 40% by mole of the structural unit of the formula (4):

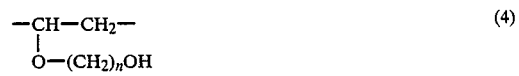

$$\begin{array}{c}—CH—CH_2—\\ |\\ O—(CH_2)_nOH\end{array} \quad (4)$$

the total amount of the structural units (a), (b), (c) and (d) being 100% by mole. The composition of the invention can be baked to substrates at a low temperature in comparison with compositions containing conventional fluorine-containing copolymers, and the films obtained by electrodepositing the composition are excellent in gloss, weatherability, adhesion to the substrates, alkali resistance and smoothness.

12 Claims, No Drawings

ELECTRODEPOSITION COATING COMPOSITION, ELECTRODEPOSITION PROCESS AND ELECTRODEPOSITED ARTICLE

BACKGROUND OF THE INVENTION

The present invention relates to an electrodeposition coating composition containing a fluorine-containing copolymer, a process for electrodepositing the composition, and an article electrodeposited with the composition.

In electrodeposition, there are few dangers such as a fire and explosion, since water is used as the main component of an electrodeposition medium. Also, since films having relatively uniform thickness can be formed even on substrates having complicated shapes, the electrodeposition is advantageous in that the automation of steps is easy and it is suitable for mass-production of coated articles.

In Japanese Examined Patent Publication (Tokkyo Kokoku) No. 28656/1974, an electrodeposition using well-known fluorine-containing polymers such as polyvinylidene fluoride is disclosed. However, the coating films of the known fluorine-containing polymers must be baked together with substrates at a relatively high temperature over 200° C. Since the substrates are limited, electrodeposition using fluorine-containing polymers has not been widely used in spite of the above-mentioned advantages.

It is an object of the present invention to provide an electrodeposition coating composition containing a fluorine-containing copolymer which enables baking of coatings at a lower temperature.

A further object of the present invention is to provide a process for electrodepositing the composition.

A still further object of the present invention is to provide an article electrodeposition with the composition.

These and other objects of the present invention will become apparent from the description hereinafter.

SUMMARY OF THE INVENTION

It has now been found that a particular fluorine-containing copolymer having anionic functional groups can be formulated into an aqueous electrodeposition coating composition without using an emulsifier and it can be baked and cured at a relatively low temperature of not more than 200° C., and that the obtained film has excellent stain resistance, weatherability and corrosion resistance.

In accordance with the present invention, there is provided an electrodeposition coating composition comprising a fluorine-containing copolymer having an anionic functional group, a curing agent and water, said copolymer comprising:

(a) 20 to 80% by mole of the structural unit of the formula (1):

$$-CFX-CF_2- \qquad (1)$$

wherein X is chlorine or fluorine, (b) 5 to 60% by mole of the structural unit of the formula (2):

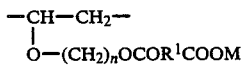

$$\begin{array}{c} -CH-CH_2- \\ | \\ O-(CH_2)_nOCOR^1COOM \end{array} \qquad (2)$$

wherein $R^1$ is an alkylene group having 2 to 6 carbon atoms or a bivalent alicyclic group having 4 to 10 carbon atoms, n is an integer of 2 to 6, and M is hydrogen, an alkali metal, a $-NHR^2R^3R^4$ group or a $-RH$ group in which $R^2$, $R^3$ and $R^4$ are the same or different and each is hydrogen, an alkyl group having 1 to 6 carbon atoms or a hydroxyalkyl group having 1 to 6 carbon atoms, and R is a nitrogen-containing cyclic group having 4 to 9 carbon atoms, (c) 0 to 40% by mole of the structural unit of the formula (3):

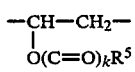

$$\begin{array}{c} -CH-CH_2- \\ | \\ O(C=O)_kR^5 \end{array} \qquad (3)$$

wherein $R^5$ is an alkyl group having 1 to 12 carbon atoms, a monovalent alicyclic group having 4 to 10 carbon atoms or a fluoroalkyl group having 2 to 10 carbon atoms, and k is 0 or 1, and (d) 0 to 40% by mole of the structural unit of the formula (4):

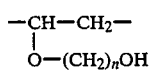

$$\begin{array}{c} -CH-CH_2- \\ | \\ O-(CH_2)_nOH \end{array} \qquad (4)$$

wherein n is as defined above, the total amount of the structural units (a), (b), (c) and (d) being 100% by mole.

Also, the present invention provides a process for electrodepositing the composition and an article electrodeposited with the composition.

DETAILED DESCRIPTION

The fluorine-containing copolymers used in the present invention usually have a number average molecular weight of 2,000 to 100,000, preferably from 5,000 to 60,000. When the number average molecular weight is less than 2,000, there is a tendency that the water resistance and the chemical resistance of electrodeposited films lower. On the other hand, when the molecular weight is more than 100,000, the smoothness of electrodeposited films lowers since the viscosity of aqueous solutions of the fluorine-containing copolymers becomes high.

The acid value of the fluorine-containing copolymer measured according to JIS K 0070 is usually from 10 to 150, preferably from 30 to 120. When the acid value is less than the above range, the copolymer is hard to disperse into water. When the acid value is more than the above range, the coating films are poor in water resistance.

The copolymers used in the present invention can be prepared by a series of the following reactions (I), (II) and (III).

(I) COPOLYMERIZATION

A copolymer having the structural units (1) and (4) which may further contain the structural units (3), is prepared by copolymerizing a monomer of the formula (i):

$$CFX=CF_2 \qquad (i)$$

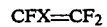

wherein X is chlorine or fluorine atom, a monomer of the formula (ii):

$$CH=CH_2 \atop | \atop O-(CH_2)_nOH \qquad (ii)$$

wherein n is an integer of 2 to 6, and optionally a monomer of the formula (iii):

$$CH=CH_2 \atop | \atop O(C=O)_kR^5 \qquad (iii)$$

wherein $R^5$ is a $C_1$ to $C_{12}$ alkyl group, a monovalent $C_4$ to $C_{10}$ alicyclic group or a $C_2$ to $C_{10}$ fluoroalkyl group, and k is 0 or 1.

(II) ESTERIFICATION OF THE COPOLYMER

The resulting copolymer of the monomers (i) and (ii) and optionally the monomer (iii) is reacted with an acid anhydride of the formula:

$$(R^1CO)_2O$$

wherein $R^1$ is an alkylene group having 2 to 6 carbon atoms or a bivalent alicyclic group having 4 to 10 carbon atoms, to convert the structural units of the formula (4) derived from the monomer (ii) into the structural units of the formula (2a):

$$-CH-CH_2- \atop | \atop O-(CH_2)_nOCOR^1COOH \qquad (2a)$$

wherein $R^1$ and n are as defined above.

When it is desired to leave a part of the structural units (4) in the copolymer, the acid anhydride is used in an amount less than equivalent to the structural units (4).

(III) NEUTRALIZATION OF CARBOXYL GROUP IN THE STRUCTURAL UNIT (2a)

The resulting copolymer having the structural units (1) and (2a) which may further contain the structural units (3) and/or (4), is reacted with a neutralizing agent to neutralize the carboxyl group included in the structural unit (2a).

When it is desired that M in the structural unit (2) is hydrogen, in other words, when the structural unit (2a) is required in the end product, the neutralization is not conducted at all or is incompletely conducted. When the copolymer is neutralized, the carboxy-containing units (2) in the copolymer are usually less than 50% of the whole units (2).

It is desirable that the content of the structural units (2) is from 5 to 60% by mole. When the content of the units (2) falls within the above range, the coating composition suitable for electrodeposition is obtained. The copolymers consisting of the structural units (1) and (2) can be used in electrodeposition coating as well as the copolymers containing additional structural units (3) and/or (4). In case of the boundary copolymers, the content of the structural units (2) is from 20 to 60% by mole.

The copolymerization in the above step (I) is carried out in an organic solvent, preferably a water-miscible organic solvent, at a temperature of $-20°$ to $+150°$ C., preferably 5° to 95° C., under a pressure of 0 to 30 kg/cm²G (gauge pressure), preferably 0 to 10 kg/cm²G.

Examples of the water-miscible organic solvent are, for instance, a ketone such as acetone, methyl ethyl ketone or cyclohexanone, an alcohol such as methanol, ethanol, isopropanol, t-butanol or n-butanol, an ether such as dimethylcarbitol, ethylene glycol monoethers or tetrahydrofuran, an amide such as dimethylformamide or dimethylacetamide, an acetic acid ester such as acetic acid ester of ethylene glycol methyl ether, and the like.

In the copolymerization, a polymerization initiator is used in an amount of 0.01 to 5 parts by weight, preferably 0.05 to 1.0 part by weight, per 100 parts by weight of the whole monomers used. Usual polymerization initiators can be used in the present invention. Representative examples of the initiators are, for instance, a peroxide such as di-isopropyl peroxydicarbonate, t-butyl peroxybutyrates or benzoyl peroxide, an azo compound such as azobisisobutyronitrile or azobisvaleronitrile, and the like.

During the polymerization, there may occur a case in which hydrogen fluoride is eliminated from the produced copolymer to lower the pH of the system, whereby the monomer (ii) is cyclized by the reaction of vinyl group and hydroxyl group of the monomer (ii). Therefore, it is desirable to add a pH controlling agent such as a tertiary amine to the polymerization system in an amount of 0.1 to 5 parts by weight per 100 parts by weight of the whole monomers.

After the completion of the polymerization, the polymerization medium having a functional group such as alcohols is usually removed from the obtained reaction mixture under reduced pressure.

The esterification in the step (II) is usually carried out by adding the copolymer obtained in the step (I), the acid anhydride and a catalyst to a reaction medium and conducting the reaction at a temperature of 30° to 100° C. for 1 to 10 hours with stirring. Representative examples of the catalyst are, for instance, zirconium naphthenate, tetrabutylzirconate, tetrabutyltitanate, tetraoctyltitanate, and the like. Representative examples of the reaction medium are, for instance, acetone, methyl ethyl ketone, cyclohexanone, dimethylcarbitol, ethylene glycol monomethyl ether acetate, and the like. The copolymer and the acid anhydride are used usually in a ratio of 1/0.5 to 1/5 by mole. The amount of the catalyst is usually from 0.01 to 1 part by weight per 100 parts by weight of the copolymer.

The structural unit (2a) can also be produced by reacting the copolymer obtained in the copolymerization step (I) with a compound of the formula (a):

$$R^6OCR^1COR^7 \qquad (a)$$

wherein $R^1$ is as defined above, and $R^6$ and $R^7$ are the same or different and each is hydroxyl group, an alkoxyl group having 1 to 5 carbon atoms, an —OM group in which M is as defined above, trimethylsilyl group, or tetrahydropyranyl group, a compound of the formula (b):

$$XOCR^1COR^8 \qquad (b)$$

wherein $R^1$ is defined above, X is a halogen, and $R^8$ is a halogen or an alkoxyl group having 1 to 5 carbon atoms, a compound of the formula (c):

$$HOOCR^1CN \qquad (c)$$

wherein $R^1$ is as defined above, or a compound of the formula (d):

$$XOCR^1CN \qquad (d)$$

wherein $R^1$ and X are as defined above, to form ester bonds between —OH group and the group $R^6OC$— in the formula (a), the group XO— in the formula (b), the group HOOC— in the formula (c) or the group XO— in the formula (d), and then, excepting the cases where the group $R^7$ in the compound (a) is hydroxyl group and the —OM group, hydrolyzing the group —$COR^7$, the group —$COR^8$ or the group —CN.

In the above esterification reaction, when the group in the compounds (a) and (b) to be reacted with —OH included in the structural unit (4) is carboxyl group or an ester, catalysts usually employed in usual esterification reaction can be employed. Examples of such catalysts are, for instance, an acid catalyst such as p-toluenesulfonic acid or sulfuric acid, a basic catalyst such as sodium hydroxide, or sodium or potassium methylate, and other catalysts such as zirconium naphthenate, nickel naphthenate, acetylacetone zinc and acetylacetone cobalt. The catalysts are used in an amount of 0.01 to 10 parts by weight per 100 parts by weight of the copolymer. The reaction temperature is from 50° to 130° C.

The hydrolysis reaction of the group —$COR^7$, —$COR^8$ and —CN can be conducted at a temperature of 30° to 100° C. using 0.1 to 10 parts by weight of a catalyst per 100 parts by weight of the copolymer. Examples of the catalyst are, for instance, a mineral acid having a concentration of 0.5 to 10% by weight, an alkali metal hydroxide, an alkaline earth metal hydroxide, an alkali metal carbonate, and the like.

The neutralization reaction in the step (III) can be carried out by dissolving the copolymer obtained in the step (II) in water or an alcohol in a concentration of 10 to 70% by weight, and adding the neutralizing agent to the resulting solution. As the neutralizing agents, there are exemplified an alkali metal hydroxide such as sodium hydroxide or potassium hydroxide, a compound of the formula:

$$NR^2R^3R^4$$

wherein $R^2$, $R^3$ and $R^4$ are the same or different and each is hydrogen atom or an alkyl or hydroxyalkyl group having 1 to 6 carbon atoms, or a nitrogen-containing cyclic compound such as pyridine, pyperidine, pyrrole, pyrrolenine or pyridazine. Representative examples of the compound $NR^2R^3R^4$ are, for instance, ammonia, monoethylamine, diethylamine, triethylamine, diethanolamine, triethanolamine, and the like. The ratio of the copolymer to the neutralizing agent is usually from 1/0.5 to ½ by mole. As the alcohol, there are mentioned, for instance, methanol, ethanol, isopropanol and t-butanol.

The curing agent incorporated in the electrodeposition coating composition of the present invention is a curing agent capable of reacting with hydroxyl group and/or carboxyl group included in the copolymer to crosslink the copolymer. Examples of the curing agent are, for instance, a blocked isocyanate such as a blocked hexamethylene diisocyanate trimer, an amino resin, and the like. The amino resin includes a melamine resin such as methylated melamine, methylolmelamine or butylolmelamine, benzoguanamine resin, a urea resin such a methylated urea or butylated urea, and the like. Among them, alkoxymethylated melamine resins of methyl ether type and of mixed $C_4$ to $C_1$ alkyl ether type are preferable.

The curing agent is used usually in an amount of 0.2 to 4 equivalents, preferably from 0.5 to 2.5 equivalents, based on the total of hydroxy group and carboxyl group present in the copolymer. When the amount of the curing agent is too much, the weatherability of the obtained films lowers, and on the other hand, when the amount is too small, the hardness of the films lowers.

In the electrodeposition, the weight ratio of water to the fluorine-containing copolymer to be placed in an electrolyte bath is from 70 to 99:1 to 30, preferably 80 to 95:5 to 20. When the amount of the copolymer is less than the above range, the electrodeposition voltage must be increased too high, and when the amount is more than the above range, the electrodeposition loss increases.

The composition may include cosolvents, such as an ethylene glycol monoether, a diethylene glycol monoalkyl ether, a diethylene glycol diether, an alcohol, a ketone and an amide, and other additives such as a pigment and a dye.

Usual electrodeposition method is applicable to the composition of the present invention. In the electrodeposition using the composition of the invention, the bath temperature is usually from 10° to 40° C., preferably from 15° to 35° C., the electrodeposition voltage is usually from 50 to 500 V, preferably from 100 to 300 V (a substrate to be electrodeposited: anode), the distance between electrodes is usually from 1 to 100 cm, preferably from 10 to 50 cm, and the electrodeposition time is usually from 0.5 to 10 minutes, preferably from 1 to 5 minutes.

After the completion of the electrodeposition, the electrodeposited article is washed with water if necessary, and then is heated at a temperature of 150° C. to 200° C. for 5 to 60 minutes to cure the coating. When the substrate used can stand a high temperature, the coated article may be heated to about 300° C.

The thickness of the coating films is usually from 2 to 50 μm.

The substrates used in the electrodeposition process of the invention are not limited so long as they are electrically conductive. When aluminum or an aluminum alloy is used as the substrate, the obtained film is excellent in the weatherability, the stain resistance and the corrosion resistance, and is uniform and smooth.

The present invention is more specifically described and explained by means of the following Examples in which all % and parts are by weight unless otherwise noted. It is to be understood that the present invention is not limited to the Examples.

The following Reference Examples are presented to illustrate the preparation of fluorine-coating copolymers used in the present invention.

REFERENCE EXAMPLE 1

[Preparation of Fluorine-Containing Copolymer]

A 1,000 ml glass autoclave was charged with 106 g of hydroxybutyl vinyl ether (hereinafter referred to as "HBVE"), 60 g of diethylene glycol dimethyl ether, 180 g of isopropanol and 1 ml of N-dimethylbenzylamine. After replacing air in the autoclave with nitrogen gas, 116 g of chlorotrifluoroethylene (hereinafter referred to as "CTFE") was added to the autoclave and the mixture was heated to 65° C. The inner pressure when the temperature became steady was 6.2 kg/cm$^2$G. To the autoclave was added 40 g of a mixture of diethylene glycol dimethyl ether and isopropanol (1/1 by weight) in which 2.5 g of azobisisobutyronitrile was dissolved, to start the polymerization. The polymerization was conducted at 65° C. for 20 hours with stirring. The pressure in the autoclave was 0.2 kg/cm$^2$ G 20 hours after starting the polymerization, and 475 g of a varnish (reaction mixture) having a nonvolatile content of 42.5% was obtained. The varnish was heated at a temperature of 60° to 80° C. under reduced pressure of 100 to 300 mmHg with suction by an evaporator to remove isopropanol.

The obtained mixture containing the produced copolymer was placed in a 500 ml glass flask. To the flask were added with stirring 109 g of 1,2-cyclohexane dicarboxylic acid anhydride (esterifying agent), 50 g of acetone and 100 μl of zirconium naphthenate. The mixture was heated under reflux of acetone for 5 hours to conduct the esterification.

After cooling the resulting reaction mixture to room temperature, a mixture of 70 g of triethylamine (neutralizing agent) and 45 g of ethanol was added dropwise over 1 hour. Thus, a varnish containing the fluorine-containing copolymer was obtained.

To the obtained varnish was added 400 g of deionized water to adjust the solid concentration to 40%, and the hydroxyl value and acid value of the fluorine-containing copolymer were measured according to JIS K 0070. The fluorine-containing copolymer had a hydroxyl value of 25 and an acid value of 100.

REFERENCE EXAMPLES 2 TO 7 [Preparation of Fluorine-Containing Copolymer]

The procedure of Example 1 was repeated except that monomers, esterifying agents and neutralizing agents shown in Table 1 were used to give varnishes containing fluorine-containing copolymers.

EXAMPLE 1

To 100 parts of the varnish containing the fluorine-containing copolymer obtained in Reference Example 1 was added 7.4 parts of hexa(alkoxymethyl)melamine (commercially available under the trade mark "Melane 620" and by Hitachi Chemical Co., Ltd., solid content 70%). After thoroughly admixing them, 269 g of deionized water was added to the uniform mixture to give an electrodeposition coating composition having a solid concentration of 12%.

The obtained composition was placed in an electrocoating bath and was coated onto an alumite-treated aluminum alloy plate as anode (6063S aluminum alloy plate having a 9 μm thick anodic oxidation coating subjected to sealing) by applying an electric current to the bath at a bath temperature of 22° C. and a voltage of 200 V for 3 minutes. The coated plate was washed with water, and was baked and cured at 180° C. for 30 minutes.

With respect to the thus formed coating film, the thickness, gloss, weatherability, adhesion to the substrate, alkali resistance and smoothness were measured by the following methods.

The results are shown in Table 2.

Film Thickness (μm)

The thickness was measured by using a film thickness meter ("PERMASCOPE EW" made by Kabushiki Kaisha Kett Kagaku Kenkyusho).

Gloss (%)

The 60° C. specular gloss was measured by using a glossmeter ("VG-2PD" made by Nippon Denshoku Kogyo Kabushiki Kaisha).

Weatherability (%)

The accelerated weathering test was made for 360 hours using a Weather-O-Meter (made by Suga Shikenki Kabushiki Kaisha) under conditions: dew cycle, irradiation/darkness=60 min./60 min.; black panel temperature 63° C. The gloss retention rate (%) was measured.

Adhesion to the Substrate

The coating film was cross-cut by a knife into 100 squares each having a size of 1×1 mm, and a cellophane adhesive tape was repeatedly stuck and peeled off 10 times. The number of remaining squares was counted.

Alkali Resistance

TABLE 1

| | Monomers (g) | Esterifying agent (part) | Neutralizer (part) | Hydroxyl value | Acid value |
|---|---|---|---|---|---|
| Ref. Ex. 2 | CTFE (116) HBVE (106) | 1,2-Cyclohexane dicarboxylic anhydride (33.1) | Triethylamine (21.5) | 78 | 78 |
| Ref. Ex. 3 | CTFE (116) HBVE (106) | 1,2-Cyclohexane dicarboxylic anhydride (39.7) | Aqueous ammonia (11.4) | 58 | 87 |
| Ref. Ex. 4 | CTFE (116) HBVE (106) | Succinic anhydride (25.8) | Triethylamine (34.4) | 63 | 95 |
| Ref. Ex. 5 | CTFE (116) HBVE (92.8) VA (39.6) | 1,2-Cyclohexane dicarboxylic anhydride (61.2) | Triethylamine (24.1) | 28 | 84 |
| Ref. Ex. 6 | CTFE (116) HBVE (106) | 1,2-Cyclohexane dicarboxylic anhydride (19.9) | Triethylamine (12.9) | 127 | 54 |
| Ref. Ex. 7 | TFE (100) HBVE (106) | 1,2-Cyclohexane dicarboxylic anhydride (94.0) | Triethylamine (37.0) | 81 | 82 |

(Notes)
VA: versatic vinyl
TFE: tetrafluoroethylene
Part: parts by weight per 100 parts by weight of copolymer The film was dipped in a 1% aqueous solution of sodium hydroxide for 72 hours and the appearance of the film was observed with the naked eye as to whether blisters were produced or not and was estimated according to the following criteria.

O: No change
X: Blisters are produced.

Smoothness

The appearance of the film after baking was observed with the naked eye with respect to the presence of pinholes and unevenness. It was estimated according to the following criteria.

O: Smooth
Δ: There are pinholes.
X: The surface is remarkably uneven.

EXAMPLES 2 TO 8 AND COMPARATIVE EXAMPLES 1 AND 2

Electrodeposition was carried out in the same manner as in Example 1 except that each of compositions shown in Table 2 was used. With respect to the obtained films, the thickness, gloss, weatherability, adhesion to the substrate, alkali resistance and smoothness were measured in the same manner as in Example 1.

The results are shown in Table 2.

TABLE 2

| | Varnish (g) | Curing agent (g) | Film thickness (μm) | Gloss (%) |
|---|---|---|---|---|
| Ex. 1 | Varnish obtained in Ref. Ex. 1 (100) | Melane 620 (7.4) | 7 | 92 |
| Ex. 2 | Varnish obtained in Ref. Ex. 2 (100) | Melane 620 (9) | 12 | 90 |
| Ex. 3 | Varnish obtained in Ref. Ex. 3 (100) | Melane 620 (8.5) | 10 | 89 |
| Ex. 4 | Varnish obtained in Ref. Ex. 4 (100) | Melane 620 (9) | 8 | 88 |
| Ex. 5 | Varnish obtained in Ref. Ex. 5 (100) | Melane 620 (5) | 10 | 90 |
| Ex. 6 | Varnish obtained in Ref. Ex. 6 (100) | Melane 620 (11) | 12 | 90 |
| Ex. 7 | Varnish obtained in Ref. Ex. 7 (100) | Melane 620 (10) | 10 | 86 |
| Ex. 8 | Varnish obtained in Ref. Ex. 1 (100) | Takenate B-87X-M* (5.0) | 8 | 83 |
| Com. Ex. 1 | Varnish obtained in Ref. Ex. 1 (100) | Melane 620 (1.5) | 7 | 88 |
| Com. Ex. 2 | Varnish obtained in Ref. Ex. 1 (100) | Melane 620 (22) | 9 | 85 |

| | Weatherability (%) | Adhesion to the substrate | Alkali resistance | Smoothness |
|---|---|---|---|---|
| Ex. 1 | 79 | 100 | | |
| Ex. 2 | 78 | 100 | | |
| Ex. 3 | 72 | 100 | | |
| Ex. 4 | 73 | 100 | | |
| Ex. 5 | 70 | 100 | | |
| Ex. 6 | 78 | 100 | | |
| Ex. 7 | 76 | 100 | | |
| Ex. 8 | 68 | 100 | | |
| Com. Ex. 1 | 31 | 87 | X | |
| Com. Ex. 2 | ** | 0 | X | |

(Note)
*Takenate B-87X-M: Blocked isophorone diisocyanate (NCO content: 12.6%, effective component: 60%) made by Takeda Yakuhin Kogyo Kabushiki Kaisha
(Note)
**The weatherability could not be measured since cracks were produced.

COMPARATIVE EXAMPLES 3 AND 4

To 100 parts of the varnish obtained in Reference Example 1 was added 7.4 parts of Melane 620 and the mixture was thoroughly admixed. To the obtained uniform mixture was added 2,151 g (Comparative Example 3) or 118 g (Comparative Example 4) of deionized water to give an electrodeposition coating composition having a solid concentration of 2% (Comparative Example 3) or a solid concentration of 20% (Comparative Example 4).

The same substrate as used in Example 1 was subjected to the electrodeposition coating by applying an electric current at 22° C. and 200 V for 1 minute. The coated plate was washed with water, and it was baked and cured at 180° C. for 30 minutes. With respect to the obtained films, the film thickness and properties of the films were measured in the same manner as in Example 1.

The results are shown in Table 3.

TABLE 3

| | Film thickness (μm) | Gloss (%) | Adhesion the the substrate | Alkali resistance | Smoothness |
|---|---|---|---|---|---|
| Com. Ex. 3 | 1 | 90 | 100 | X | Δ |
| Com. Ex. 4 | 10 | 72 | 100 | | X |

The composition of the present invention which contains the fluorine-containing copolymer having the anionic functional group —COOM as a main component, can be baked onto substrates at a lower temperature in comparison with conventional compositions containing fluorine-containing polymers. Further, the film formed by electrodeposition with the composition are excellent in the gloss, weatherability, adhesion to substrates, alkali resistance and smoothness.

What we claim is:

1. An electrodepositing coating composition consisting essentially of a fluorine-containing copolymer having an anionic functional group, a curing agent and water, said copolymer comprising:
   (a) 20 to 80% by mole of the structure unit of the formula (1):

wherein X is chlorine or fluorine,
   (b) 5 to 60% by mole of the structural unit of the formula (2):

wherein $R^1$ is an alkylene group having 2 to 6 carbon atoms or a bivalent alicyclic group having 4 to 10 carbon atoms, n is an integer of 2 to 6, and M is hydrogen, an alkali metal, a $-NHR^2R^3R^4$ group or a $-RH$ group in which $R^2$, $R^3$ and $R^4$ are the same or different and each is hydrogen, an alkyl group having 1 to 6 carbon atoms or a hydroxyalkyl group having 1 to 6 carbon atoms, and R is a nitrogen-containing cyclic group having 4 to 9 carbon atoms,
   (c) 0 to 40% by mole of the structural unit of the formula (3):

wherein $R^5$ is an alkyl group having 1 to 12 carbon atoms, a monovalent alicyclic group having 4 to 10 carbon atoms or a fluoroalkyl group having 2 to 10 carbon atoms, and k is 0 or 1, and
   (d) 0 to 40% by mole of the structural unit of the formula (4):

wherein n is as defined above,
   the total amount of the structural units (a), (b), (c) and (d) being 100% by mole, said copolymer having an acid value in the range 54–150.

2. The composition of claim 1, wherein said fluorine-containing copolymer has a number average molecular weight of 2,000 to 100,000.

3. Composition of claim 1, wherein said fluorine-containing copolymer has an acid value in the range 54–120.

4. The composition of claim 1, wherein the weight ratio of water to said fluorine-containing copolymer is from 70 to 99:30 to 1.

5. The composition of claim 1, wherein said curing agent is present in an amount of 0.2 to 4 equivalents based on the total of hydroxyl group and carboxyl group present in said fluorine-containing copolymer.

6. The composition of claim 1, wherein said fluorine-containing copolymer has an acid value in the range 54–100.

7. An electrodeposition coating process which comprises electrodepositing an aqueous coating composition to a substrate, said composition consisting essentially of a fluorine-containing copolymer having an anionic functional group, a curing agent and water, wherein the weight ratio of water to said fluorine-containing copolymer is from 70 to 99:30 to 1, said copolymer comprising:
   (a) 20 to 80% by mole of the structural unit of the formula (1):

wherein X is chlorine or fluorine,
   (b) 5 to 60% by mole of the structural unit of the formula (2):

wherein $R^1$ is an alkylene group having 2 to 6 carbon atoms or a bivalent alicyclic group having 4 to 10 carbon atoms, n is an integer of 2 to 6, and M is hydrogen, an alkali metal, a $-NHR^2R^3R^4$ group or a $-RH$ group in which $R^2$, $R^3$ and $R^4$ are the same or different and each is hydrogen, an alkyl group having 1 to 6 carbon atoms or a hydroxyalkyl group having 1 to 6 carbon atoms, and R is a nitrogen-containing cyclic group having 4 to 9 carbon atoms,
   (c) 0 to 40% by mole of the structural unit of the formula (3):

wherein $R^5$ is an alkyl group having 1 to 12 carbon atoms, a monovalent alicyclic group having 4 to 10 carbon atoms or a fluoroalkyl group having 2 to 10 carbon atoms, and k is 0 or 1, and
   (d) 0 to 40% by mole of the structural unit of the formula (4):

wherein n is as defined above,
   the total amount of the structural units (a), (b), (c) and (d) being 100% by mole, said copolymer having an acid value in the range of 54–150.

8. The process of claim 7, wherein said fluorine-containing copolymer has a number average molecular weight of 2,000 to 100,000.

9. The process of claim 6, wherein said fluorine-containing copolymer has an acid value in the range 54–120.

10. The process of claim 7, wherein said curing agent is present in an amount of 0.2 to 4 equivalents based on the total of hydroxyl group and carboxyl group present in said fluorine-containing copolymer.

11. The process of claim 6, wherein said fluorine-containing copolymer has an acid value in the range 54–100.

12. An article electrodeposited with a composition consisting essentially of a fluorine-containing copolymer having an anionic functional group and a curing agent, said copolymer comprising:

(a) 20 to 80% by mole of the structural unit of the formula (1):

$$-CFX-CF_2- \quad (1)$$

wherein X is chlorine or fluorine, (b) 5 to 60% by mole of the structural unit of the formula (2):

$$\begin{array}{c} -CH-CH_2- \\ | \\ O-(CH_2)_n OCOR^1 COOM \end{array} \quad (2)$$

wherein $R^1$ is an alkylene group having 2 to 6 carbon atoms or a bivalent alicyclic group having 4 to 10 carbon atoms, n is an integer of 2 to 6, and M is hydrogen, an alkali metal, a $-NHR^2R^3R^4$ group or a $-RH$ group in which $R^2$, $R^3$ and $R^4$ are the same or different and each is hydrogen, an alkyl group having 1 to 6 carbon atoms or a hydroxyalkyl group having 1 to 6 carbon atoms, and R is a nitrogen-containing cyclic group having 4 to 9 carbon atoms, (c) 0 to 40% by mole of the structural unit of the formula (3):

$$\begin{array}{c} -CH-CH_2- \\ | \\ O(C=O)_k R^5 \end{array} \quad (3)$$

wherein $R^5$ is an alkyl group having 1 to 12 carbon atoms, a monovalent alicyclic group having 4 to 10 carbon atoms or a fluoroalkyl group having 2 to 10 carbon atoms, and k is 0 or 1, and (d) 0 to 40% by mole of the structural unit of the formula (4):

$$\begin{array}{c} -CH-CH_2- \\ | \\ O-(CH_2)_n OH \end{array} \quad (4)$$

wherein n is as defined above, the total amount of the structural units (a), (b), (c) and (d) being 100% by mole, said copolymer having an acid value in the range 54–150.

* * * * *